(12) United States Patent
Murakami et al.

(10) Patent No.: US 11,581,105 B2
(45) Date of Patent: Feb. 14, 2023

(54) ROTARY CHARGE STRIPPING FILM IN CHARGE STRIPPING DEVICE OF ION BEAM AND CHARGE STRIPPING METHOD OF ION BEAM

(71) Applicants: KANEKA CORPORATION, Osaka (JP); RIKEN, Saitama (JP)

(72) Inventors: Mutsuaki Murakami, Osaka (JP); Masamitsu Tachibana, Osaka (JP); Atsushi Tatami, Osaka (JP); Hiroo Hasebe, Saitama (JP)

(73) Assignees: KANEKA CORPORATION, Osaka (JP); RIKEN, Saitama (JP)

( * ) Notice: Subject to any disclaimer, the term of this patent is extended or adjusted under 35 U.S.C. 154(b) by 1025 days.

(21) Appl. No.: 16/320,340

(22) PCT Filed: Jul. 27, 2017

(86) PCT No.: PCT/JP2017/027254
§ 371 (c)(1),
(2) Date: Jan. 24, 2019

(87) PCT Pub. No.: WO2018/025746
PCT Pub. Date: Feb. 8, 2018

(65) Prior Publication Data
US 2019/0237212 A1    Aug. 1, 2019

(30) Foreign Application Priority Data

Aug. 5, 2016 (JP) .............................. JP2016-154299

(51) Int. Cl.
*G21K 1/14* (2006.01)
*G21K 5/08* (2006.01)
(Continued)

(52) U.S. Cl.
CPC .............. *G21K 1/14* (2013.01); *C01B 32/182* (2017.08); *G21K 1/00* (2013.01); *G21K 5/08* (2013.01)

(58) Field of Classification Search
CPC .. G21K 1/00; G21K 1/14; G21K 5/08; H05H 7/10; C01B 32/182
See application file for complete search history.

(56) References Cited

U.S. PATENT DOCUMENTS 8,432,090 B2    4/2013 Colard
2010/0272977 A1    10/2010 Hasegawa et al.
(Continued)

FOREIGN PATENT DOCUMENTS

EP    3228591 A1    10/2017
EP    3285263 A1    2/2018
(Continued)

OTHER PUBLICATIONS

Kamigaito, Osamu, et al. "Presentstatus and future plan of RIKEN RI Beam Factory." Proc. IPAC'16 (2016): 1281.*
(Continued)

*Primary Examiner* — Richard M Rump
(74) *Attorney, Agent, or Firm* — Osha Bergman Watanabe & Burton LLP

(57) ABSTRACT

An object of the present invention is to provide a charge stripping film in a charge stripping device of an ion beam, which has high heat resistance and no toxicity, with which there is no risk of activation, with which an ion beam can be made multivalent even if the charge stripping film is thin, and which is resistant to high-energy beam radiation over an extended period of time. The present invention comprises a charge stripping film used in a device which strips a charge of an ion beam, wherein the charge stripping film is a rotary charge stripping film comprising a carbon film having a
(Continued)

thermal conductivity of 20 W/mK or more in a film surface direction at 25° C., and a film thickness of the carbon film is more than 3 μm and less than 10 μm. The present invention also comprises a charge stripping film used in a device which strips a charge of an ion beam, wherein the charge stripping film is a rotary charge stripping film comprising a carbon film produced by a polymer annealing method, and a film thickness of the carbon film is more than 3 μm and less than 10 μm.

3 Claims, 11 Drawing Sheets

(51) Int. Cl.
*C01B 32/182* (2017.01)
*G21K 1/00* (2006.01)

(56) References Cited

U.S. PATENT DOCUMENTS

| | | | |
|---|---|---|---|
| 2016/0249453 A1* | 8/2016 | Tatami | C01B 32/205 |
| 2017/0267908 A1 | 9/2017 | Murakami et al. | |
| 2018/0049306 A1 | 2/2018 | Murakami et al. | |
| 2018/0102195 A1 | 4/2018 | Murakami et al. | |
| 2019/0088450 A1 | 3/2019 | Murakami et al. | |
| 2019/0159330 A1 | 5/2019 | Murakami et al. | |

FOREIGN PATENT DOCUMENTS

| | | |
|---|---|---|
| EP | 3285264 A1 | 2/2018 |
| EP | 3451347 A1 | 3/2019 |
| JP | S55-23035 A | 2/1980 |
| JP | 2007-137690 A | 6/2007 |
| JP | 2009-87581 A | 4/2009 |
| JP | 2010-257664 A | 11/2010 |
| JP | 2010-287419 A | 12/2010 |
| JP | 2012-099354 A | 5/2012 |
| WO | 2007/058224 A1 | 5/2007 |
| WO | 2013043930 A1 | 3/2013 |
| WO | 2015/045641 A1 | 4/2015 | |
| WO | WO-2015045641 A1 * | 4/2015 | ........... C01B 32/205 |
| WO | 2016088845 A1 | 6/2016 | |

OTHER PUBLICATIONS

Hasebe, Hiroo, et al. "Development of rotating beryllium disk stripper." Journal of Radioanalytical and Nuclear Chemistry 305.3 (2015): 825-829.*
Hong, S. G., et al. "Design and test of a graphite target system for in-flight fragment separator." Nuclear Instruments and Methods in Physics Research Section A: Accelerators, Spectrometers, Detectors and Associated Equipment 752 (2014): 1-5.*
I. Sugai et al.; Abstract of "Fabrication of Isotopic and Natural Carbon Foils by Thermal Cracking Method and some Issues"; 27th International Conference of the International Nuclear Target Development Society (INTDS—2014) Tokyo, Japan, Aug. 2014 (1 page).
H. Hasebe et al.; "Development of a new foil compounded from carbon nanotubes and sputter-deposition carbon" Journal of Radioanalytical and Nuclear Chemistry, vol. 299, pp. 1013-1018, 2014 (6 pages).
H. Imao et al.; "Study of Gas Charge Stripper for Acceleration of High-Intensity Heavy Ion Beam"; Proceedings of the 8th Annual Meeting of Particle Accelerator Society of Japan, pp. 174-177, Tsukuba, Japan, Aug. 1-3, 2011 (4 pages) with partial English translation.
Written Opinion of the International Searching Authority issued in PCT/JP2017/027254 dated Oct. 24, 2017 (6 pages).
International Search Report issued in PCT/JP2017/027254 dated Oct. 24, 2017 (2 pages).
Y. Momozaki et al.; Abstract of "Proton Beam-on-Liquid Lithium Stripper Film Experiment"; 27th International Conference of the International Nuclear Target Development Society (INTDS—2014) Tokyo, Japan, Aug. 2014 (1 page).
H. Hasebe et al.; Abstract of "Development of rotating beryllium disk stripper"; 27th International Conference of the International Nuclear Target Development Society (INTDS—2014) Tokyo, Japan, Aug. 2014 (1 page).
Extended European Search Report issued in corresponding European Application No. 17836852.8; dated Mar. 19, 2020 (10 pages).

* cited by examiner

Fig. 5
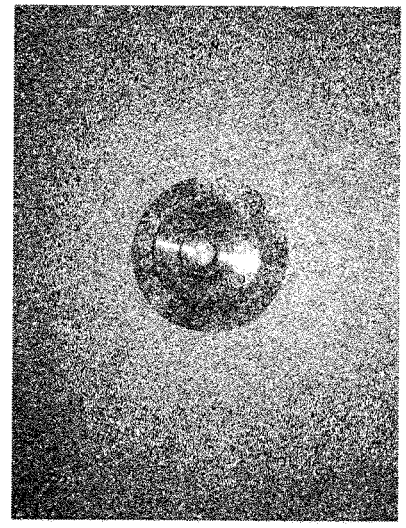
(a) Before Rotation
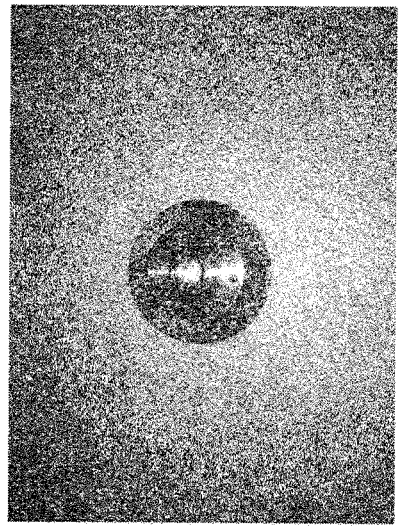
(b) After Rotation

Fig. 6
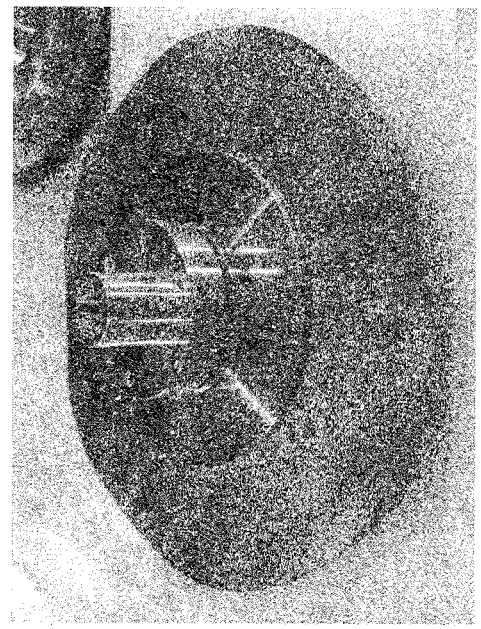
(b) After Beam Irradiation
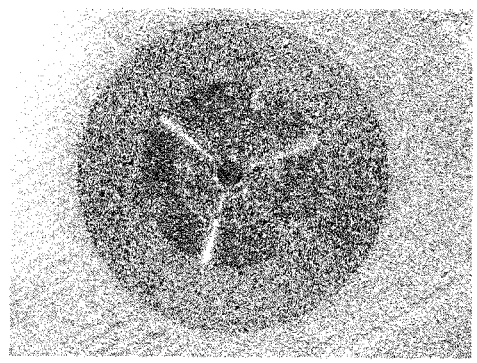
(a) Before Beam Irradiation Fig. 8
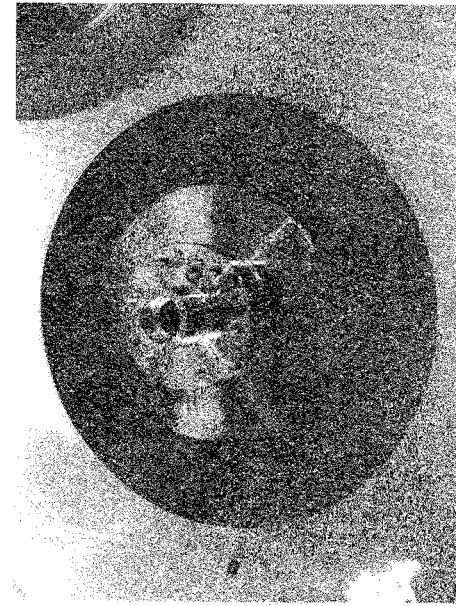
(a) Before Irradiation
(b) After Irradiation
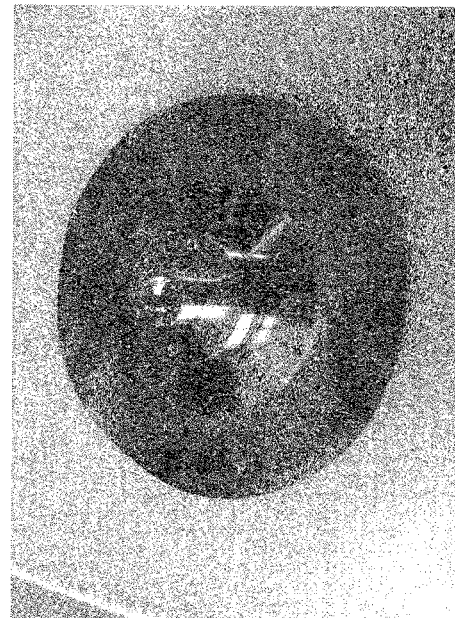
(c) Before Irradiation
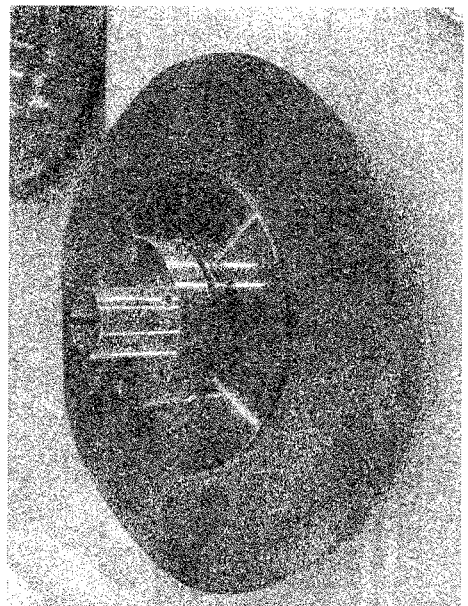
(d) After Irradiation Fig. 9
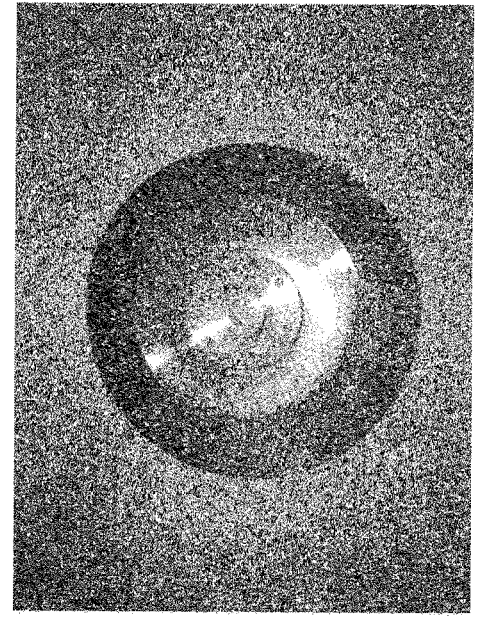
(a) Before Irradiation
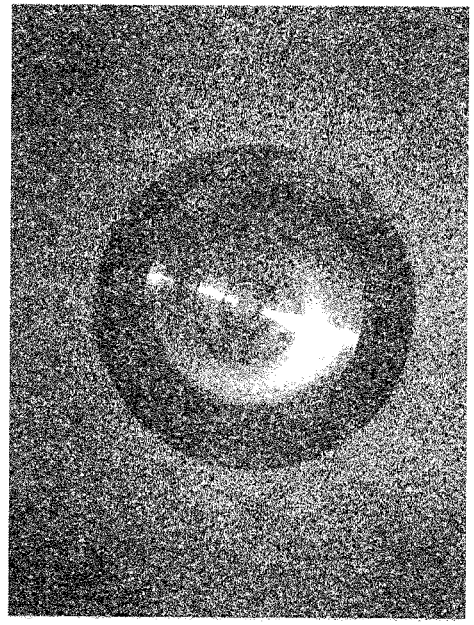
(b) After Irradiation

ROTARY CHARGE STRIPPING FILM IN CHARGE STRIPPING DEVICE OF ION BEAM AND CHARGE STRIPPING METHOD OF ION BEAM

TECHNICAL FIELD

The present invention relates to a rotary charge stripping film used in a charge stripping device of an ion beam and a charge stripping method using the rotary charge stripping film.

BACKGROUND ART

In order to efficiently accelerate a beam in an ion beam accelerator, it is necessary to strip electrons from ions to adjust into an intended valence. A charge stripping film plays an important role for stripping electrons from ions to adjust into an appropriate valence. Liquid lithium, beryllium, a carbon film, a carbon-boron composite film, a carbon nanotube composite film, and a carbon-organic composite film have been reported as charge stripping films (Non-Patent Document 1).

Patent Document 1 also reports that a carbon film is vapor-deposited on a vapor-deposited substrate obtained by vacuum-depositing nickel chloride on a glass substrate by arc discharge or the like, and the film is used as a charge stripping film. In addition, Patent Document 2 also reports a carbon-boron composite film as a charge stripping film.

Although carbon nanotube (CNT) composite films as disclosed in Patent Document 3 have high physical strength, they may be broken due to a long-time operation because of a low heat resistance, so that there is a problem in reliability such as necessity to stop the operation of the accelerator at each time (Non-Patent Document 2).

Further, in order to prevent a beam energy after passing through a charge stripping film from decreasing too much, a film thickness of the charge stripping film should be reduced, but on the other hand, when the film thickness becomes thin, a beam after passing through the film is difficult to be made multivalent. Furthermore, since an ion beam has high energy, a load applied to the charge stripping film is large, so that the charge stripping film is required to have durability. In order to improve the durability, attempts have been made to prevent the beam from being intensively irradiated to a specific portion of the charge stripping film by rotating the charge stripping film (Non-Patent Document 2).

Non-Patent Document 3 discloses the use of a gas stripper of hydrogen or helium for charge stripping.

PRIOR ART DOCUMENTS

Patent Documents

[Patent Document 1] JP55-23035A
[Patent Document 2] WO2007/058224
[Patent Document 3] JP2009-87581A

Non-Patent Documents

[Non-Patent Document 1] 27th International Conference of the International Nuclear Target Development Society (INTDS-2014) Tokyo, Japan, August, 2014.
[Non-Patent Document 2] Hasebe H. et al, DEVELOPMENT OF NEW FOIL COMPOUNDED FROM CARBON NANOTUBE AND SPUTTER-DEPOSITION CARBON, Journal of Radioanalytical and Nuclear Chemistry, 2014, 299, 1013-1018.
[Non-Patent Document 3] Hiroshi Imao et. al, STUDY OF GAS CHARGE STRIPPER FOR ACCELERATION OF HIGH-INTENSITY HEAVY ION BEAM, Proceedings of the 8th Annual Meeting of Particle Accelerator Society of Japan, Aug. 1-3, 2011, Tsukuba, Japan

SUMMARY OF THE INVENTION

Problems to Be Solved By the Invention

Since lithium reacts with water, a charge stripping film produced from liquid lithium disclosed in Non-Patent Document 1 is very expensive and becomes complicated because a special device is required under a rare gas atmosphere not containing any moisture.

Beryllium of Non-Patent Document 1 has been frequently used as a target material because it is a light element and it has a high charge stripping efficiency. However, beryllium is very expensive, and beryllium-containing dust is toxic to the human body, so there is a problem that it may cause a fatal chronic disease called chronic beryllium disease.

The deposited carbon film disclosed in Patent Document 1 has problems such as a weak physical strength and a low heat resistance. Further, the carbon-boron composite film of Patent Document 2 has serious problems such that impurities such as sodium contained in the reagent used for film formation are activated by beam irradiation. In addition, the CNT composite film of Patent Document 3 contains iron and silicon at the time of film formation. For this reason, the charge stripping film after the beam irradiation has been activated and there was a problem that it takes several months before such a charge stripping film can be carried out from the radiation control area.

In addition, as described above, a thin charge stripping film is advantageous for preventing reduction in beam energy after charge stripping but on the other hand, making the beam multivalent after passing the charge stripping film is difficult, and it is difficult to use a thin charge converting film as a rotary type.

Furthermore, the gas stripper disclosed in Non-Patent Document 3 is preferable from the viewpoint of durability and stability, but a large-scale device is necessary.

In view of the above circumstances, an object of the present invention is to provide a charge stripping film in a charge stripping device of an ion beam, which has high heat resistance and no toxicity, with which there is no risk of activation, with which an ion beam can be made multivalent even if the charge stripping film is thin, and which is resistant to high-energy beam radiation over an extended period of time, and to provide a convenient charge stripping method of an ion beam.

Solutions to the Problem

The present inventions which can solve the problems are as follows.
[1] A charge stripping film used in a device which strips a charge of an ion beam, wherein the charge stripping film is a rotary charge stripping film comprising a carbon film having a thermal conductivity of 20 W/mK or more in a film surface direction at 25° C., and a film thickness of the carbon film is 0.2 μm or more and less than 10 μm.
[2] The charge stripping film according to [1], wherein the film thickness of the carbon film is more than 3 μm and less than 10 μm.

[3] The charge stripping film according to [1] or [2], wherein the carbon film is a graphite film having a carbon atomic concentration of 97% or more.

[4] The charge stripping film according to any one of [1] to [3], wherein the carbon film has a thermal conductivity of 500 W/mK or more in the film surface direction at 25° C.

[5] The charge stripping film according to any one of [1] to [4], wherein the carbon film has an area of 4 cm$^2$ or more.

[6] The charge stripping film according to any one of [1] to [5], wherein a density of the carbon film is not less than 0.90 g/cm$^3$ and not more than 2.26 g/cm$^3$.

[7] The charge stripping film according to any one of [1] to [6], wherein the density of the carbon film is not less than 2.0 g/cm$^3$ and not more than 2.26 g/cm$^3$.

[8] The charge stripping film according to any one of [1] to [7], wherein the carbon film has a circular shape.

[9] A charge stripping film used in a device which strips a charge of an ion beam, wherein the charge stripping film is a rotary charge stripping film comprising a carbon film produced by a polymer annealing method, and a film thickness of the carbon film is 0.2 μm or more and less than 10 μm.

[10] The charge stripping film according to [9], wherein the film thickness of the carbon film is more than 3 μm and less than 10 μm.

[11] A charge stripping method of an ion beam, comprising irradiating the charge stripping film according to any one of [1] to [10], which is rotating, with an ion beam.

[12] The charge stripping method according to [11], wherein a rotation speed of the charge stripping film is not less than 1 rpm and not more than 3000 rpm.

[13] The charge stripping method according to [11] or [12], wherein a charge stripping of the ion beam is performed in a vacuum environment of 1×10$^{-3}$ Pa or less.

[14] The charge stripping method according to any one of [11] to [13], wherein the ion beam is an ion beam of an atom having an atomic number of 6 or more.

Effects of the Invention

The charge stripping film of the present invention including a carbon film having a thermal conductivity of 20 W/mK or more in the film surface direction at 25° C. can be produced by a polymer annealing method, has no risk of toxicity and activation and can make an ion beam multivalent with a high efficiency. In addition, since the charge stripping film of the present invention can be used as a rotary type, the beam is not irradiated intensively to only one point of the charge stripping film and the charge stripping film can withstand a long-term use. Further, according to the charge stripping method using the charge stripping film of the present invention, the charge stripping of the ion beam can be performed more conveniently than the charge stripping method using a gas stripper.

BRIEF DESCRIPTION OF THE DRAWINGS

FIG. 5 is a drawing substitute photograph showing an appearance shape before and after rotating the charge stripping film of the present invention.

FIG. 6 is a photograph substitute for a drawing, showing an appearance shape of the charge stripping film of reference example before and after irradiation with a calcium ion beam.

FIG. 8 is a photograph substitute for a drawing, showing appearance shapes of the charge stripping films of examples ((a) and (b)) and reference examples ((c) and (d)) before and after irradiation with a uranium ion beam.

FIG. 9 is a photograph substitute for a drawing, showing an appearance shape of the charge stripping film of example before and after irradiation with a uranium ion beam.

MODE FOR CARRYING OUT THE INVENTION

Figure 1:
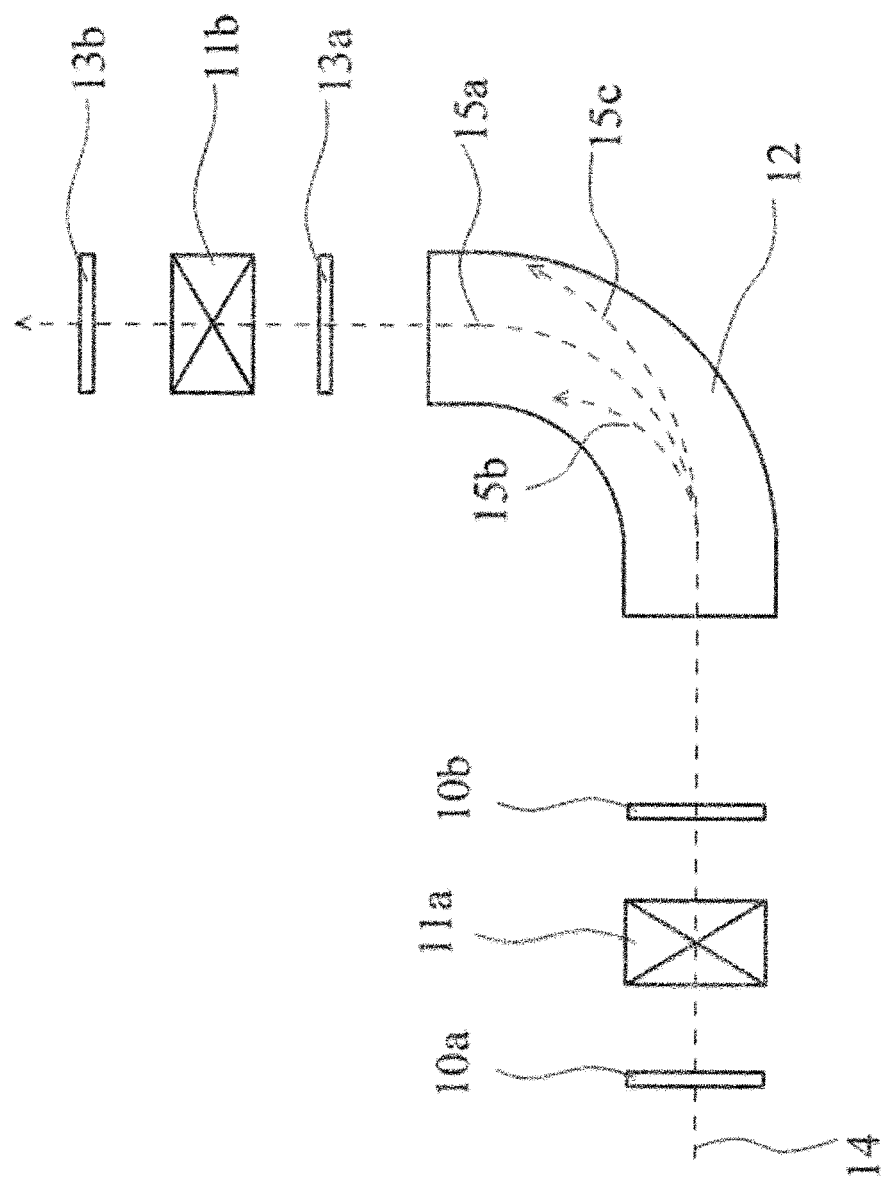
FIG. 1 is a schematic diagram showing one example of charge stripping method of an ion beam.

As a result of intensive studies to solve the above-mentioned problems, the inventors of the present invention have found that even if a charge stripping film including a carbon film having a thermal conductivity of 20 W/mK or more in the film surface direction at 25° C. is a thin charge stripping film having a thickness of 0.2 μm or more and less than 10 μm (preferably more than 3 μm and less than 10 μm), the ion beam after passing through this charge stripping film is made sufficiently multivalent and the valence distribution has become sharp. That is, the charge stripping film of the present invention can stably remove electrons from the incident ion beam to obtain ions having a desired valence at a high production rate. Further, since the carbon film of the present invention is hardly broken even when rotated, it can be a rotary type and even when a high intensity beam is irradiated for a long time, it is hardly damaged by energy load and is excellent in durability.

The charge stripping film of the present invention including a carbon film having a thermal conductivity of 20 W/mK or more at 25° C. in the film surface direction can be produced by a polymer annealing method, that is, a method of heat treating a polymer film. The thermal conductivity of the charge stripping film of the present invention is higher than that of the carbon film obtained by the vapor deposition method or the like. Here, the "surface" in the film surface direction means a surface perpendicular to the thickness direction of the film. In the polymer annealing method described later, it is considered that a graphite structure is first formed on the outermost surface layer of the polymer carbonized film at the time of the secondary heat treatment, and the graphite structure grows toward the inside of the film. As the film thickness of the carbon film increases, the graphite structure becomes more disordered and a cavity or a defect is more likely to arise toward inside the carbon film. Contrarily, as the film thickness decreases, the graphitization proceeds to inside in a well-ordered state of the graphite layer structure of the film surface, resulting in that a graphite structure that is well-ordered all over the film is likely to be formed. It is considered that the thinner film is easier to arrange the graphite layer structure, and therefore the charge stripping film of the present invention becomes a film showing a high thermal conductivity. The thermal conductivity tends to increase as the secondary heat treatment temperature of the polymer film described later increases and the thermal conductivity is preferably 100 W/mK or more, more preferably 150 W/mK or more, and further preferably 200 W/mK or more. Further, from the viewpoint that the charge stripping film can withstand irradiation with a large intensity beam for a long period as the thermal diffusivity becomes higher, the thermal conductivity is preferably 500 W/mK or more, more preferably 800 W/mK or more, further preferably 1000 W/mK or more, most preferably 1500 W/mK or more. The upper limit of the thermal conductivity is not particularly limited, but it is, for example, 2500 W/mK or less and may be 2300 W/mK or less.

The charge stripping film of the present invention has a film thickness of 0.2 μm or more and less than 10 μm. The film thickness of the charge stripping film may be adjusted according to the type and intensity of the beam to be used and the stripping efficiency to the target valence and may be 1 μm or more, may be more than 3 μm, may be 4 μm or more or 5 μm or more, and may be 8 μm or less or 9 μm or less.

When using a stationary charge stripping film, the ion beam is intensively irradiated to one point of the charge stripping film. On the other hand, as the charge stripping film of the present invention is a rotary type, concentrated irradiation of the ion beam can be prevented, so that the durability of the charge stripping film can be improved. The shape of the charge stripping film of the present invention is not particularly limited as long as it can be rotated, and examples thereof include a circular shape, an elliptical shape, a square shape, and the like, but from the viewpoint of ensuring uniformity during rotation, a circular shape is preferable. The circular shape means that the outer periphery of the charge stripping film has a circumferential shape, and includes, for example, a shape (donut shape) in which the vicinity of the center of a circle is cut.

The density of the charge stripping film of the present invention is preferably 0.90 g/cm$^3$ or more. When a defect or a cavity enters inside the carbon film, the density tends to be reduced and the thermal conductivity also tends to be decreased. It is considered that heat is likely to be trapped in the cavity part, and the carbon film having a low density is susceptible to deterioration by the heat. Thus, the density of the charge stripping film is preferably large, more preferably 1.5 g/cm$^3$ or more, further preferably 2.0 g/cm$^3$ or more, most preferably 2.1 g/cm$^3$ or more. The upper limit of the density is 2.26 g/cm$^3$ or less and may be 2.20 g/cm$^3$ or less.

The area of the charge stripping film of the present invention is preferably 4 cm$^2$ or more. If the charge stripping film is too small, fixing the charge stripping film to a jig or the like is difficult, and the heat dissipation efficiency is deteriorated. On the other hand, the charge stripping film with a larger area has better thermal diffusivity, and can withstand the high intensity beam over a long period of time. The area of the charge stripping film is preferably 9 cm$^2$ or more, more preferably 16 cm$^2$ or more, most preferably 25 cm$^2$ or more. The upper limit of the area is not particularly limited, but it is usually about 900 cm$^2$.

As described later, since the charge stripping film of the present invention can be obtained by heat treatment of a polymer film, it has a high carbon purity. The higher carbon purity can prevent the activation at the time of irradiation with a high intensity beam for a longer time, and a highly efficient conversion to multivalence becomes possible. The carbon atomic concentration in the charge stripping film of the present invention is usually 97% or more, preferably 98.5% or more, and more preferably 99% or more. The charge stripping film of the present invention preferably has the carbon atomic concentration in the above range (97% or more, preferably 98.5% or more, more preferably 99% or more) and also is a graphite film. Particularly, metallic impurities such as aluminum, iron, sodium, potassium, cobalt, titanium, and nickel that can be a cause of activation are desirably below detection limits. The raw material of the charge stripping film for an ion beam of the present invention is a polymer film as will be described later, and the charge stripping film is never contaminated by impurities including metals during the production process thereof. Also, by annealing the polymer film at a temperature of 2400° C. or more as will be described later, nitrogen, oxygen, and hydrogen in the polymer are eliminated and only pure carbon are likely to remain. Therefore, the method of the present invention is a very excellent method for forming a film composed of pure carbon and has a feature of being unlikely to have contaminants other than carbon.

In addition, a laminated structure of plural smooth surfaces of the charge stripping film of the present invention produced by the polymer annealing method is observed in a sectional image obtained by SEM (Scanning Electron Microscope) observation at a magnification of approximately 10,000 to 20,000 times.

It is also preferred that the charge stripping film for an ion beam has a mechanical strength and a small thermal expansion coefficient by heating and cooling. By reducing the thermal expansion coefficient of the film, distortion due to the thermal expansion can be reduced, so that mechanical damage can be suppressed. The thermal expansion coefficient in the film surface direction of the charge stripping film of the present invention is preferably $9 \times 10^{-6}$/K or less, more preferably $7 \times 10^{-6}$/K or less, even more preferably $5 \times 10^{-6}$/K or less. The lower limit of the thermal expansion coefficient is not particularly limited, but it is usually about $5 \times 10^{-7}$/K.

In order to convert the ion beam to the intended valence, adjusting the carbon mass per unit area is preferable. The carbon mass is preferably, for example, 0.2 mg/cm$^2$ or more and less than 2.2 mg/cm$^2$, more preferably 0.25 mg/cm$^2$ or more and 2.0 mg/cm$^2$ or less, further preferably 0.3 mg/cm$^2$ or more and 2.0 mg/cm$^2$ or less.

When the charge stripping film of the present invention is used as a charge stripping film, the charge stripping film for an ion beam of the present invention adjusted to have an intended thickness may be used alone (single layer body), or two or more films may be laminated to adjust into an intended thickness (laminated body). By using the charge stripping film for an ion beam of the present invention, charge stripping films with various thicknesses that are optimum for the desired beam valence can be easily produced only by changing the combination of the charge stripping films for an ion beam having different thicknesses.

In the case of using two or more charge stripping films for an ion beam of the present invention, the charge stripping film may be used as a laminate in close contact with each other or may be arranged independently one by one in the traveling direction of the beam. Even when the charge stripping films of the present invention are used as a laminate, they are used as a charge stripping film with a total thickness of 0.2 μm or more (preferably more than 3 μm) and less than 10 μm. Also, in the case of arranging the charge stripping films one by one independently, if the interval is too small, heat is likely to be trapped between the charge stripping films at the time of irradiation with a beam, and the possibility of damage arises. Therefore, in using two or more films, it is preferable to use the films as a laminate by bringing the films into close contact with each other.

In the case of using the charge stripping film for an ion beam of the present invention as a charge stripping film, laminating a different kind of carbon film on the charge stripping film for an ion beam is also preferable. In particular, in order to precisely control the ion valence of the beam, the thickness of the charge stripping film may be precisely controlled. In such a case, the thickness may be precisely controlled by forming a carbon film (carbonaceous film) on the charge stripping film for an ion beam of the present invention by vapor deposition, sputtering or the like.

Also, it is preferred to laminate the charge stripping film of the present invention and at least one layer of a metal or a metal oxide to form a laminate film for a charge stripping film. Laminating with a metal or a metal oxide is preferred from the view point of improving the adhesion with a target material to which direct adhesion of the carbon film is difficult. It is also preferred to further laminate a graphite layer having different orientation on the charge stripping film, and fine adjustment to an intended film thickness can be easily achieved by laminating a carbon film by various methods including sputtering and vapor deposition.

According to the charge stripping film of the present invention produced by the polymer annealing method, even when the film thickness is as thin as 0.2 μm or more (preferably more than 3 μm) and less than 10 μm, the incident ion beam can be sufficiently converted into multivalence. For example, the uranium beam of 64+ can be converted so that the peak of the valence is in the range of 70+ or more, preferably 74+ or more, more preferably 78+ or more and 82+ or less, preferably 81+ or less. Further, according to the charge stripping film of the present invention, it is possible to sharpen the valence distribution after charge stripping and strip the charge so that the generation rate of peak valence, relative to the total of generation rates of individual valence of the beam after charge stripping, is 0.150 or more (preferably 0.200 or more, more preferably 0.220 or more, further preferably 0.230 or more, and the upper limit is, for example, 0.350 or less).

In addition, since the charge stripping film of the present invention is produced by a polymer annealing method and is a rotary type, pinholes, chipping or the like does not occur even when a high thermal load is applied. For example, occurrence of pinholes and chipping can be prevented even when a thermal load of 0.1 W or more, preferably 4 W or more, more preferably 5 W or more, or further preferably 6 W or more is applied. The upper limit of the thermal load that can prevent occurrence of pinholes and chipping is, for example, 22 W or less. Particularly in the case of exceeding 3 μm of the film thickness of the charge stripping film, occurrence of pinholes and chipping can be prevented even when a thermal load of 4 W or more, preferably 5 W or more, more preferably 6 W or more, is applied. Thus, such a film thickness is preferred.

Next, a process for producing the charge stripping film of the present invention will be described. The charge stripping film of the present invention can be produced by using a predetermined polymer raw material and heat treating it under an inert gas atmosphere.

1. Polymer Raw Material

The polymer raw material which is preferably used as a raw material for the charge stripping film of the present invention is an aromatic polymer, and example of the aromatic polymer is preferably at least one kind selected from polyamide, polyimide, polyquinoxaline, polyparaphenylenevinylene, polyoxadiazole, polybenzimidazole, polybenzoxazole, polybenzthiazole, polyquinazolinedione, polybenzoxazinone, polyquinazolone, benzimidazobenzophenanthroline ladder polymer, and derivatives thereof. Films made from these polymer materials may be produced by a known production process. As particularly preferable polymer raw materials, aromatic polyimide, polyparaphenylenevinylene, and polyparaphenyleneoxadiazole are exemplified. In particular, aromatic polyimide is preferable, and aromatic polyimide prepared through polyamic acid from the following acid dianhydride (particularly aromatic acid dianhydride) and diamine (particularly aromatic diamine) can be particularly preferable as a polymer raw material for preparing the charge stripping film of the present invention.

Examples of the acid dianhydride which can be used for the synthesis of the aromatic polyimide include pyromellitic anhydride, 2,3,6,7-naphthalenetetracarboxylic dianhydride, 3,3',4,4'-biphenyl tetracarboxylic dianhydride, 1,2,5,6-naphthalenetetracarboxylic dianhydride, 2,2',3,3'-biphenyl tetracarboxylic dianhydride, 3,3',4,4'-benzophenone tetracarboxylic dianhydride, 2,2-bis(3,4-dicarboxyphenyl)propane dianhydride, 3,4,9,10-perylenetetracarboxylic dianhydride, bis(3,4-dicarboxyphenyl)propane dianhydride, 1,1-bis(2,3-dicarboxyphenyl)ethane dianhydride, 1,1-bis(3,4-dicarboxyphenyl)ethane dianhydride, bis(2,3-dicarboxyphenyl) methane dianhydride, bis(3,4-dicarboxyphenyl)ethane dianhydride, oxydiphthalic dianhydride, bis(3,4-dicarboxyphenyl)sulfone dianhydride, p-phenylenebis(trimellitic acid monoester acid anhydride), ethylenebis(trimellitic acid monoester acid anhydride), bisphenol A bis(trimellitic acid monoester acid anhydride), and analogs thereof. They can be used singly or a mixture of any desired ratio. Particularly from the viewpoint that the polyimide film having a polymer structure having a very rigid structure has higher orientation and in view of the availability, pyromellitic anhydride and 3,3',4,4'-biphenyltetracarboxylic dianhydride are particularly preferred.

Diamines which can be used for the synthesis of the aromatic polyimide include 4,4'-diaminodiphenyl ether, p-phenylenediamine, 4,4'-diaminodiphenylpropane, 4,4'-diaminodiphenylmethane, benzidine, 3,3'-dichlorobenzidine, 4,4'-diaminodiphenyl sulfide, 3,3'-diaminodiphenyl sulfone, 4,4'-diaminodiphenyl sulfone, 4,4'-diaminodiphenyl ether, 3,3'-diaminodiphenyl ether, 3,4'-diaminodiphenyl ether, 1,5-diaminonaphthalene, 4,4'-diaminodiphenyldiethylsilane, 4,4'-diaminodiphenylsilane, 4,4'-diaminodiphenylethylphosphine oxide, 4,4'-diaminodiphenyl N-methylamine, 4,4'-diaminodiphenyl N-phenylamine, 1,4-diaminobenzene (p-phenylenediamine), 1,3-diaminobenzene, 1,2-diaminobenzene, and analogs thereof, and these can be used singly or a mixture of any desired ratio. Further, from the view point of improving the orientation of the polyimide film and the availability, the aromatic polyimide is particularly preferably synthesized by using 4,4'-diaminodiphenylether or p-phenylenediamine as a raw material.

For the preparation of polyamic acid from the acid dianhydride and diamine, a known method can be used, and normally, at least one kind of acid dianhydrides and at least one kind of diamines are dissolved in an organic solvent, and the obtained solution of polyamic acid in organic solvent is stirred under a controlled temperature condition until polymerization between the acid dianhydride and the diamine completes. These polyamic acid solutions are usually obtained at a concentration of 5% by mass or more and 35% by mass or less, preferably 10% by mass or more and 30% by mass or less. When the concentration falls within this range, an appropriate molecular weight and solution viscosity can be obtained. The molar amounts of the acid dianhydride and the diamine in the raw material solution are preferably adjusted to be substantially equal, and the molar ratio of the acid dianhydride to the diamine (acid dianhydride/diamine) is, for example, 1.5/1 or less and 1/1.5 or more, preferably 1.2/1 or less and 1/1.2 or more, more preferably 1.1/1 or less and 1/1.1 or more.

2. Synthesis of Polymer Raw Materials and Film Formation

The polymer film can be produced from the polymer raw material or a synthetic raw material thereof by various known techniques. For example, as a process for producing the polyimide, a heat curing method in which a polyamic acid as a precursor is converted into imide by heating, and a chemical curing method in which a polyamic acid is converted into imide by using a dehydrating agent typified by acid anhydride such as acetic anhydride, or tertiary amines such as picoline, quinoline, isoquinoline, and pyridine as an imidization promoting agent are known, and any of these methods can be used. A chemical curing method is preferred from the view point that the obtained film has a small coefficient of linear expansion, and high modulus of elasticity, and tends to have large birefringence index, and is not damaged under a tension during annealing of the film, and a carbon film having excellent quality is obtained. The chemical curing method is excellent also in the aspect of improvement in the thermal conductivity of the carbon film.

The polyimide film is produced by casting a solution of polyamic acid, which is the aforementioned polyimide precursor, in an organic solvent, on a support such as an endless belt or a stainless drum and drying to allow imidization. Specifically, the production process of the film by chemical curing is as follows. First, in the polyamic acid solution, a stoichiometric quantity or more of a dehydrating agent, and a catalytic amount of an imidization promoting agent are added, and the solution is casted or applied on a support plate or an organic film of PET or the like, or a support such as a drum or an endless belt, to give a film form, and the organic solvent is evaporated to give a film having self-supportability. Subsequently, the film is imidized while it is further heated and dried, thereby to obtain a polyimide film. The temperature in heating is preferably in the range of 150° C. to 550° C. Further, the production process of the polyimide preferably includes the step of fixing or elongating the film so as to prevent it from contracting. This is based on the fact that conversion into the carbon film proceeds more easily by using a film in which molecular structure and its higher order structure are controlled. That is, in order to make the graphitization reaction proceed smoothly, it is necessary to rearrange the carbon molecules in the graphite precursor. It is supposed that conversion to graphite is easy to proceed even at low temperature because only minimum rearrangement is required in polyimide having excellent orientation.

The charge stripping film for an ion beam of the present invention has a thickness within the range of 0.2 μm or more (preferably more than 0.3 μm) and less than 10 μm, and for obtaining a carbon film of such a range, the thickness of the polymer film as a raw material is preferably in the range of 0.4 μm or more (preferably 8 μm or more) and less than 25 μm in the case of aromatic polyimide. This is because the thickness of the finally obtained carbon film generally depends on the thickness of the starting polymer film, as well as because the thickness of the charge stripping film for an ion beam obtained in the process of the primary heat treatment and the secondary heat treatment becomes about ½ of the thickness of the polymer as a raw material. In the charge stripping film, it is desirable that the thickness of the film can be freely changed depending on the valence of the original beam, the valence of the beam after charge stripping, and the kind of beam. According to the polymer annealing method, it is possible to freely vary the thickness of the obtainable charge stripping film for an ion beam by controlling the film thickness of the polymer film as a raw material, and it is further possible to easily vary the area or the shape. Thus, the polymer annealing method is very suitable method for producing a charge stripping film.

3. Carbonization (Primary Heat Treatment) and Secondary Heat Treatment

Next, the technique of carbonization (primary heat treatment) and secondary heat treatment of a polymer film typified by polyimide will be described. In the present invention, a polymer film as a starting material is preheated in an inert gas or in a vacuum to be carbonized. As the inert gas, nitrogen, argon or a mixed gas of argon and nitrogen is preferably used. The preheating is generally conducted at about 1000° C. The heating rate to the preheating temperature is not particularly limited, but can be, for example, 5° C./minute or more and 15° C./minute and less. In the preheating stage, it is effective to apply a pressure in the vertical direction on a film surface to such an extent that breakage of the film does not occur so as to prevent the orientation of the starting polymer film from being lost.

The film carbonized by the method as described above is set in a high temperature furnace, and a secondary heat treatment is carried out. In the secondary heat treatment, graphitization is preferably carried out to obtain a graphite film. The carbonized film is preferably set in such a manner that it is sandwiched between cold isostatic pressing (CIP) materials or glassy carbon substrates. The secondary heat treatment is conducted preferably at 2400° C. or more, more preferably at 2900° C. or more, and most preferably at 3000° C. or more. This manner can improve the thermal conductivity in the film surface direction of the obtainable charge stripping film for an ion beam. This treatment temperature may be the maximum treatment temperature in the secondary heat treatment process and the obtained charge stripping film may be reheated in the form of annealing. In order to produce such a high temperature, generally, a current is directly applied to a graphite heater, and heating is conducted by utilizing the Joule heat. While the secondary heat treatment is conducted in an inert gas, argon is the most appropriate as an inert gas, and a small amount of helium may be added to argon. The higher treatment temperature can obtain the graphite with a higher quality by conversion, however, an excellent charge stripping film for an ion beam is obtained even when the treatment temperature is, for example, 3700° C. or less, particularly, 3600° C. or less, or 3500° C. or less.

The heating rate from the preheating temperature (primary heat treatment temperature) to the secondary heat treatment temperature can be, for example, 1° C./minute or more and 25° C./minute or less. The retention time at the treatment temperatures is, for example, 10 minutes or more, preferably 30 minutes or more, and may be 1 hour or more. The upper limit of the retention time is not particularly limited, but may be generally 10 hours or less, particularly about 5 hours or less. When the heat treatment is conducted at a temperature of 3000° C. or more, it is preferred that the atmosphere in the high-temperature furnace be pressurized by the inert gas. When the heat treatment temperature is high, carbon starts sublimating from the film surface, and deterioration phenomena such as expansion of holes and cracks on the film surface, and thinning occur. However, by pressurization, such deterioration phenomena can be prevented, and an excellent film (in particular, a graphite film) can be obtained. The pressure (gauge pressure) of atmosphere in the high-temperature furnace by the inert gas is, for example, 0.05 MPa or more, preferably 0.10 MPa or more, more preferably 0.14 MPa or more. Although the upper limit of the pressure of atmosphere is not particularly limited, it may be, for example, 2 MPa or less, particularly, about 1.8 MPa or less. After the heat treatment, the temperature can be lowered at a rate of, for example, 30° C./minute or more and 50° C./minute or less.

Next, a charge stripping method using a charge stripping film will be described. The charge stripping method using a charge stripping film has an advantage of being simpler than the conventional charge stripping method using a gas stripper. FIG. 1 is a schematic view showing one example of a charge stripping method of an ion beam using a charge stripping film. The charge stripping method of an ion beam shown in FIG. 1 includes charge stripping films 10a and 10b for removing electrons from an incident ion beam, electromagnets 11a and 11b for converging beams, a bending magnet 12 for bending a beam track, and beam profile detectors 13a and 13b. Either one or both of the charge stripping films 10a and 10b may be provided, and the rotary charge stripping film of the present invention may be used at any position of 10a and 10b, but it is preferably used at the position of 10b. The side where an incident ion beam 14 enters is defined as an upstream side, for example, the charge stripping film 10a on the upstream side can be a stationary charge stripping film, and the charge stripping film 10b on the downstream side can be a rotary charge stripping film.

The charge stripping method of the present invention is not limited to the configuration shown in FIG. 1, but when stripping the charge of the ion beam by irradiating the rotary charge stripping film of the present invention with the ion beam, the ion beam is irradiated to the charge stripping film which is rotating. More specifically, the charge stripping film of the present invention is placed on the ion beam path such that the ion beam is irradiated to a part of the charge stripping film of the present invention in a state before rotation, the charge stripping film is then rotated, and the ion beam is irradiated to the rotating charge stripping film. At this time, it is preferable that the arrangement of the charge stripping film is determined such that the charge stripping film always intersects the ion beam path during rotation, and it is preferable that the ion beam is irradiated to the peripheral edge portion of the charge stripping film. The peripheral edge portion refers to a portion inside the inscribed circle C of the charge stripping film (in the case where the charge stripping film is circular, the inscribed circle C is equal to the circle of the charge stripping film), the portion excluding the rotation center. Preferably the peripheral edge portion is a region sandwiched between the circumference of a circle A which is a concentric circle of the inscribed circle C and whose radius is ¼ of the radius of the circle C, and the circumference of a circle B which is a concentric circle of circle C and whose radius is ⅞ of the radius of circle C. In this manner, by using the charge stripping film as a rotary type, the ion beam is not concentrated on one point of the charge stripping film during irradiation, so that the durability of the charge stripping film is improved.

The rotation speed of the charge stripping film of the present invention is, for example, 1 rpm or more and 3000 rpm or less. The rotation speed is preferably 100 rpm or more, more preferably 500 rpm or more and is preferably 2500 rpm or less, more preferably 2000 rpm or less.

The charge stripping is preferably carried out under a vacuum environment, and the degree of vacuum is preferably $1\times10^{-3}$ Pa or less, more preferably $5\times10^{-4}$ Pa or less, further preferably $1\times10^{-4}$ Pa or less. The lower limit of the degree of vacuum is not particularly limited, but is for example $1\times10^{-9}$ Pa.

In FIG. 1, electromagnets for converging a beam can be arranged on the upstream side of the charge stripping film and can be arranged particularly on the upstream side of the charge stripping film 10b. The ion beam incident from the upstream side of the device (for example, $U^{64+}$ etc.) 14 is converged by a beam converging electromagnet as needed and passes through the charge stripping film 10a and/or 10b, and the track of the ion beam is bent by the bending magnet 12. By preliminarily setting a current at a predetermined value, only ions 15a having a specific valence pass through the bending magnet 12, and beams 15b and 15c having other valences collide with a wall surface of a vacuum box of the bending magnet 12 and disappear. On the downstream side of the bending magnet 12, the beam converging electromagnet 11b can be arranged, and the beam passing through the electromagnet 11b for converging the beam is then further accelerated by a ring cyclotron (not illustrated). The beam profile and the valence distribution of ions can be detected by the beam profile detector 13a between the bending magnet 12 and the electromagnet 11b for converging the beam, or by the beam profile detector 13b on the downstream side of the electromagnet 11b for converging the beam.

Figure 2:
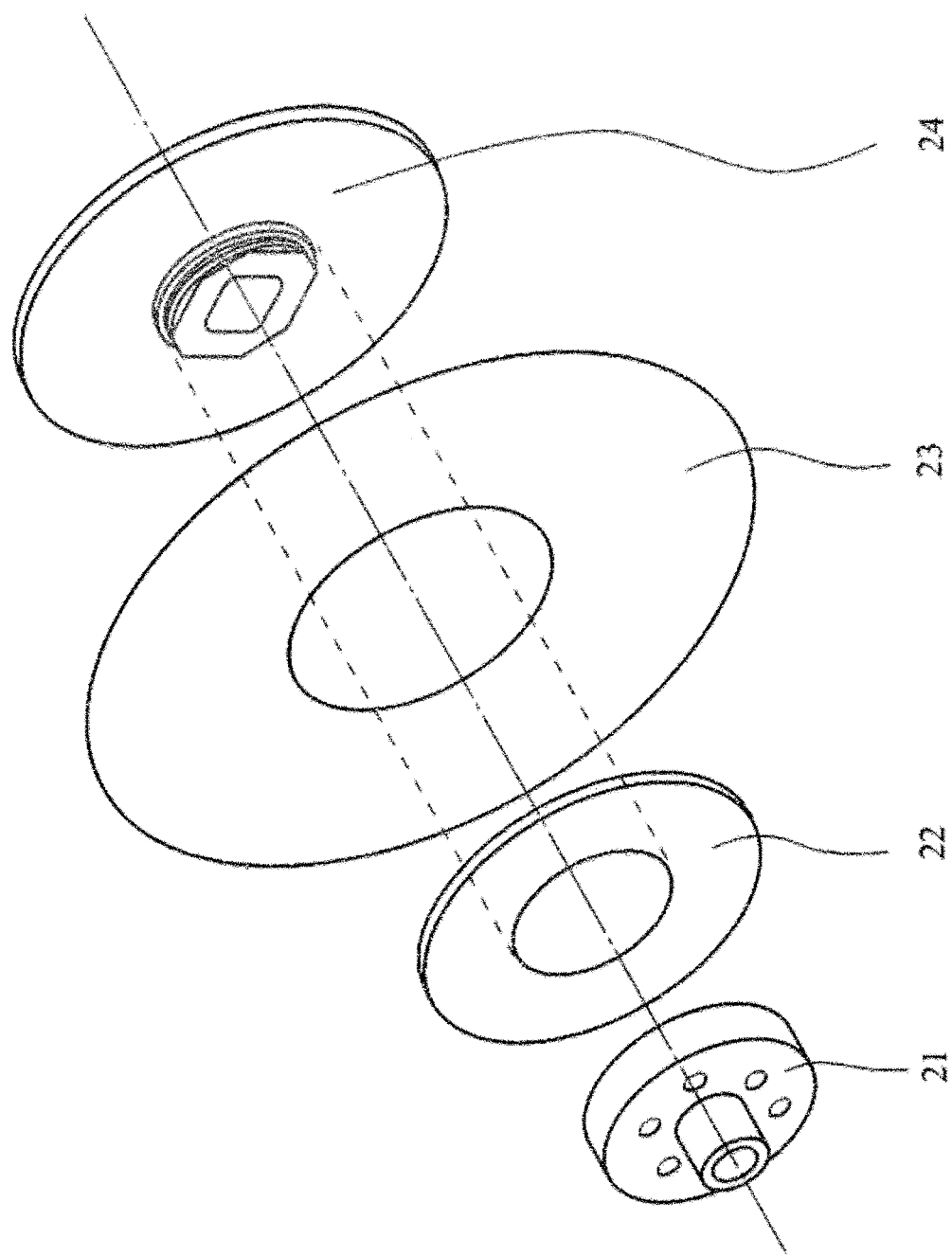
FIG. 2 is a schematic view showing one example of the charge stripping film of the present invention and its holder.
Figure 3:
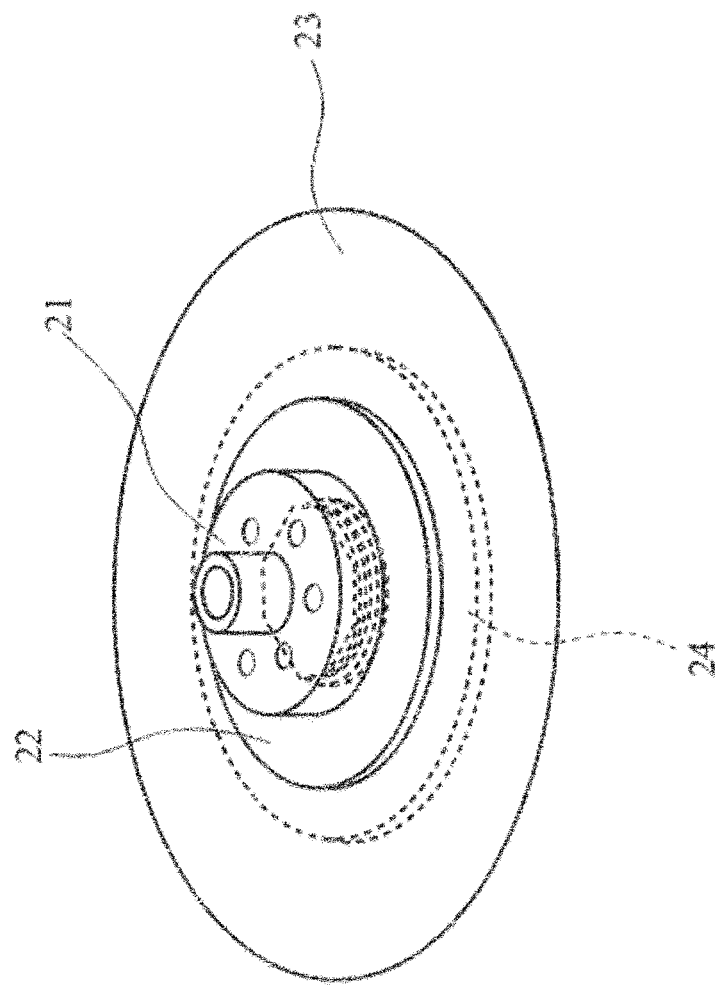
FIG. 3 is a schematic view showing one example of a state in which the charge stripping film of the present invention is attached to a holder.

The rotary charge stripping film of the present invention is preferably a charge stripping film having a jig serving as the axis of rotation at the center thereof, and in this case, it is more preferable that the carbon film is circular. FIG. 2 is a schematic perspective view showing one example of the rotary charge stripping film and its holder, including a substrate 21 for fixing a charge stripping film, a substrate 22 for supporting a charge stripping film, a rotary charge stripping film 23, and a substrate 24 for fixing a charge stripping film, the substrate 24 being laminated on the rear side of the rotary charge stripping film 23. Then, the generated beam whose valence is increased by passing through the rotary charge stripping film 23 and by being deprived of electrons is sent to the downstream accelerator. The materials for the substrates 21 and 24 for fixing a charge stripping film and the substrate 22 for supporting a charge stripping film are, for example, metals such as aluminum, copper, and stainless steel.

In the illustrated example, the rotary charge stripping film 23 is fixed at the center by using a circular substrate 21 for fixing a charge stripping film, a circular substrate 22 for supporting a charge stripping film, and a circular substrate 24 for fixing a charge stripping film. However, a structure in which the rotary charge stripping film 23 is rotated by using a bearing or directly connecting to a motor may be adopted. The shapes of the substrate 21 for fixing a charge stripping film, the substrate 22 for supporting a charge stripping film, and the substrate 24 for fixing a charge stripping film are not particularly limited as long as each member can be bonded.

In the illustrated example, the rotary charge stripping film 23 is described as a single sheet (single layer), but the number of the charge stripping films 23 is not particularly limited, and the carbon film of the present invention may be laminated, or the carbon film of the present invention and the carbon film produced by a method other than the polymer annealing method may be laminated. In addition, at least one layer of a metal and a metal oxide may be laminated on the carbon film of the present invention, or a graphite layer having a different orientation may be further laminated. The total thickness of the charge stripping film may be controlled by a method of adjusting the number of carbon films depending on the type of beam to be used and the desired charge.

The charge stripping film may be pressed and flattened, or a plurality of charge stripping films may be laminated, and the charge stripping films may be brought into close contact with each other using a room temperature press, a heat press, an ultrahigh temperature heat press or the like. Further, a plurality of charge stripping films may be arranged with a space in the traveling direction of the beam.

In addition, the charge stripping films may be brought into close contact with each other by applying a coal pitch, a polymer material or the like to a charge stripping film, laminating a plurality of charge stripping films thereon, room temperature pressing or heat pressing, and heating graphitization with ultrahigh temperature treatment or ultrahigh temperature heat press.

The charge stripping film of the present invention can be used for ion beams of all atoms, but since the charge stripping film has high thermal conductivity and shows excellent heat dissipation properties, charge stripping can be conducted satisfactorily without being damaged even when irradiated with a high intensity beam or the like. Thus, the charge stripping film of the present invention can be suitably used as a film for charge stripping of an ion beam of, for example, uranium, xenon, krypton, zinc, iron, argon, calcium, magnesium, sodium, neon, oxygen, carbon, hydrogen, or the like (preferably, an element having an atomic number of 6 or more). In particular, it is preferable to use the charge stripping film of the present invention having a film thickness of more than 3 μm and less than 10 μm as a charge stripping film for charge stripping of ion beams of elements having an atomic number of 6 or more, such as uranium, xenon, krypton, zinc, iron, argon, calcium, magnesium, sodium, neon, oxygen, and carbon. The charge stripping film of the present invention can be preferably used as a charge stripping film for use not only in a large-size accelerator, but also in a medical accelerator such as an accelerator for cancer therapy and in a relatively small-size accelerator for industrial use or the like.

The present application claims the benefit of the priority date of Japanese patent application No. 2016-154299 filed on Aug. 5, 2016. All of the contents of the Japanese patent application No. 2016-154299 filed on Aug. 5, 2016, are herein incorporated by reference.

EXAMPLES

Hereinafter, the present invention will be described more specifically with reference to examples. The present invention is not limited to examples described below and can be naturally carried out by proper modifications within a range which is suitable to the gist described above or below. All of these are included in the technical scope of the present invention.

Physical properties of the charge stripping film were evaluated by the following methods (a) to (d).

(a) Film Thickness Measurement

The thicknesses of the charge stripping film of the present invention and the polymer film as a raw material have an error of about ±5 to 10%. Therefore, the film thickness of each of the charge stripping film and the polymer film was measured by a HEIDENHAIN ND 280 at 10 different points in each sample, and the arithmetic average value thereof was taken as the thickness of each sample.

(b) Density and Mass Per Unit Area

The volume ($cm^3$) was calculated by measuring the size and film thickness of the produced charge stripping film, and the mass (g) of the charge stripping film was separately measured and the density of the charge stripping film was calculated from the formula: density ($g/cm^3$)=mass (g)/volume ($cm^3$). Further, the mass per unit area ($mg/cm^2$)=mass (mg)/area ($cm^2$) was determined from the size and mass of the charge stripping film. Note that the density of the charge stripping films D and E with a thickness of 2 μm or less was taken as a reference value because of errors due to wrinkles.

(c) Thermal Conductivity

The thermal diffusivity of the charge stripping film was measured at 25° C. in vacuum (about $10^{-2}$ Pa) under a frequency of 10 Hz using a thermal diffusivity measuring device based on the periodic heating method ("LaserPit" device, manufactured by ULVAC-RIKO, Inc.). In this measuring method, a thermocouple is attached at a point apart by a certain distance from a point irradiated with a laser beam to be heated, and the temperature change of the thermocouple is measured. The thermal conductivity (W/mK) was calculated by multiplying thermal diffusivity ($m^2/s$), density ($kg/m^3$), and specific heat (798 kJ/(kg·K)).

The thermal diffusivity of the charge stripping films D and E having a thickness of 2 μm or less was measured using a periodical heating radiant temperature measuring (Thermo Analyzer TA3 manufactured by BETHEL Co., Ltd.). This is a device that performs periodic heating with a laser and temperature measurement with a radiation thermometer, and this device is completely non-contact with the graphite sheet at the time of measurement, so it is possible to measure even using a sample with a graphite sheet thickness of 1 μm or less. The thermal conductivity (W/mK) of the charge stripping films D and E each having a thickness of 2 μm or less was calculated by multiplying thermal diffusivity ($m^2/s$), density (2.26 $kg/m^3$, theoretical value not including errors due to wrinkles), and specific heat (716 kJ/(kg·K)).

(d) Determination of Carbon Atomic Concentration

The carbon atomic concentration of the produced carbon films A to C was measured by a scanning electron microscope (SEM) SU4600 manufactured by Hitachi High-Technologies Corporation, and a large-diameter SDD detector (EDX-XMax) manufactured by HORIBA, Ltd. The analysis of the charge stripping film was conducted at an accelerating voltage of 20 kV, and the carbon atomic concentration was determined by carbon atomic concentration (%) calculated after the analysis by attached software.

The carbon atomic concentration of the carbon films D and E produced was measured using ULTRAPLUS manufactured by Zeiss, and XFlash 6|30 manufactured by Bruker. The charge stripping film was analyzed at an accelerating voltage of 10 kV, and the carbon atomic concentration was determined by carbon atomic concentration (%) calculated after the analysis by attached software.

(Production of Polymer Films)

A hardener containing 20 g of acetic anhydride and 10 g of isoquinoline was mixed with 100 g of an 18% by mass DMF (N,N-dimethylformamide) solution of a polyamic acid synthesized from pyromellitic acid anhydride, and 4,4'-diaminodiphenyl ether at a molar ratio of 1/1, or from pyromellitic anhydride, 4,4'-diaminodiphenyl ether and p-phenylenediamine at a molar ratio of 5/4/1, and the obtained mixture was stirred, centrifuged to be defoamed, and then cast and applied on an aluminum foil. The process from stirring to defoaming was conducted under cooling at 0° C. After heating the resultant laminate of the aluminum foil and the polyamic acid solution at 120° C. for 150 seconds, and at 300° C., 400° C., and 500° C. for 30 seconds each, the aluminum foil was removed to prepare polyimide films each having different thicknesses. Regarding the thickness of the polyimide film, five kinds of films each having a different thickness in the range of 2 μm, 4 μm, 10 μm, 25 μm, and 75 μm were produced by adjusting the casting speed or the like.

(Production of Charge Stripping Films A to E)

Five polyimide films each having a different thickness (2 μm, 4 μm, 10 μm, 25 μm, and 75 μm) were heated up to 1000° C. at a rate of 10° C./minute in nitrogen gas using an electric furnace, and they were retained at 1000° C. for 1 hour to conduct a pre-treatment. Then the obtained carbonized films were set inside a cylindrical carbon heater and heated up to 2900° C. at a heating rate of 20° C./minute to conduct a heat treatment. The films were retained at this temperature for 30 minutes, and then the temperature was lowered at a rate of 40° C./minute, thereby to produce charge stripping films A to E. The treatment was conducted in an argon atmosphere under a pressure of 0.1 MPa.

Table 1 shows measurement results of film thickness, density, mass per unit area, thermal conductivity, and carbon atomic concentration of the charge stripping films A to E. In Table 1, the physical properties of the charge stripping films used in comparative examples described later are also shown.

TABLE 1

| Charge Stripping Film | Thickness (μm) | Density (g/cm$^3$) | Mass per Unit Area (mg/cm$^2$) | Thermal Conductivity (W/mK) | Carbon Atomic Concentration (%) |
|---|---|---|---|---|---|
| A | 4 | 2.23 | 0.91 | 1550 | >99 |
| B | 10 | 2.20 | 2.2 | 1480 | >99 |
| C | 35 | 2.00 | 7 | 1500 | >99 |
| D | 1 | 2.26 | 0.23 | 1200 | >99 |
| E | 2 | 2.26 | 0.45 | 1500 | >99 |
| Vapor-deposited Film for Comparison | 7.5 | about 2 | 1.5 | — | — |
| Arizona Film 1 | 5 | about 2 | 1 | — | 98 |
| Arizona Film 2 | 14 | about 2 | 2.8 | 13 | 94 |

Figure 4:
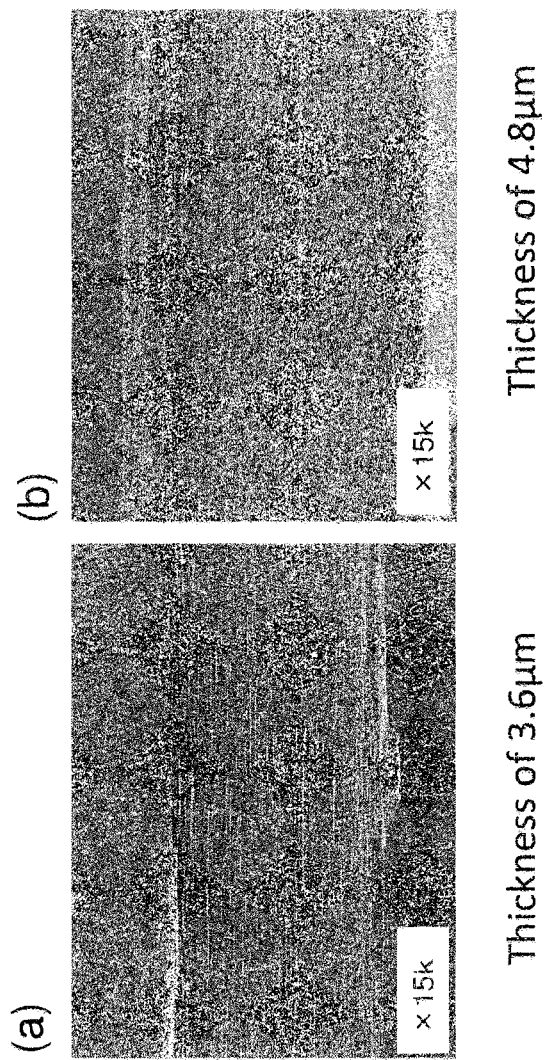
FIG. 4 is a photograph substitute for a drawing, showing a cross-sectional SEM image of the charge stripping film of the present invention.

With respect to the charge stripping films each having a film thicknesses of 3.6 μm and 4.8 μm produced in the same manner as the charge stripping films A to E, the cross section of the charge stripping film was observed with a scanning electron microscope (SEM) at a magnification of 15000 times. The observed photograph is shown in FIG. 4. In the cross section of the charge stripping film of the present invention, a laminated structure of a plurality of smooth surfaces is observed from FIG. 4.

Next, the charge stripping films A to E, and a vapor deposition film for comparison, an Arizona film 1 (XCF manufactured by Arizona Carbon Co., Ltd.) for comparison, and an Arizona film 2 (PCG manufactured by Arizona Carbon Co., Ltd.) for comparison were evaluated by (1) durability of the charge stripping film when rotated at high speed or durability of the charge stripping film when irradiated with calcium ion beam and uranium beam, (2) charge stripping rate of calcium ion beam and uranium ion beam, and (3) convergence of uranium beam after passing through the charge stripping film.

(1) Evaluation of Durability of Charge Stripping Film
(1-1) Durability when Rotating at High Speed Example 1-1

A charge stripping film D (thickness 1 μm) cut out into a size of ϕ55 mm was attached to the holder shown in FIG. 2 (the material of the substrate 21 for fixing a charge stripping film was aluminum, and the outer diameter was 35 mm) and rotated at 1000 rpm for 44 minutes while changing the rotation speed from 100 rpm to 200 rpm, 300 rpm, 500 rpm, 750 rpm, and 1000 rpm in this order. The appearance photographs before and after rotating are shown in FIG. 5. FIG. 5(a) is a photograph of external appearance before being rotated, and FIG. 5(b) is a photograph of external appearance after being rotated. As can be seen from FIG. 5, distortion, damage, and the like were not confirmed even after the charge stripping film of the present invention was rotated at a high speed of 1,000 rpm and the same external appearance as before the rotation was maintained.

(1-2) Durability when Irradiated with Calcium Ion Beam

Reference Example 1-1

Evaluation of the charge stripping rate was carried out by irradiating the charge stripping film B arranged at the position 10b shown in FIG. 1, with a Ca$^{16+}$ (calcium) DC (Direct Current) beam having a beam current of about 10 eμA, a beam energy of 45 MeV/u, and a beam shape of 4 to 5 mm in diameter, using an accelerator of Nishina Center for Accelerator-Based Science, RIKEN, Japan. The degree of vacuum during charge stripping was 1×10$^{-3}$ Pa or less, and the size of the charge stripping film was ϕ11 cm.

The calcium ion beam was irradiated to the charge stripping film B rotated at a minimum rotation speed of 300 rpm using the holder shown in FIG. 2 for a total of 236 hours. The thermal load on the charge stripping film at this current value was 6.366 W and the total number of irradiation particles of calcium was 3.31×10$^{18}$. Photographs of the film before and after irradiation are shown in FIG. 6. The film after the beam irradiation was slightly deformed in the vicinity of the beam irradiation position and there was no big difference from before use, and furthermore pinholes, chipping, and the like could not be confirmed.

Comparative Example 1

A calcium ion beam similar to that of Reference Example 1-1 was used except that the beam current in Reference Example 1-1 was changed to about 4.5 eμA and the irradiation time in Reference Example 1-1 was changed to 336.7 hours, and a vapor deposition film for comparison having a weight per unit area of about 1.5 mg/cm$^2$ (thickness is about 7.5 μm) prepared by a vapor deposition device having a magnetron sputtering source was used in a stationary manner as a charge stripping film. Physical properties of the vapor deposition film for comparison are as shown in Table 1.

Figure 7:
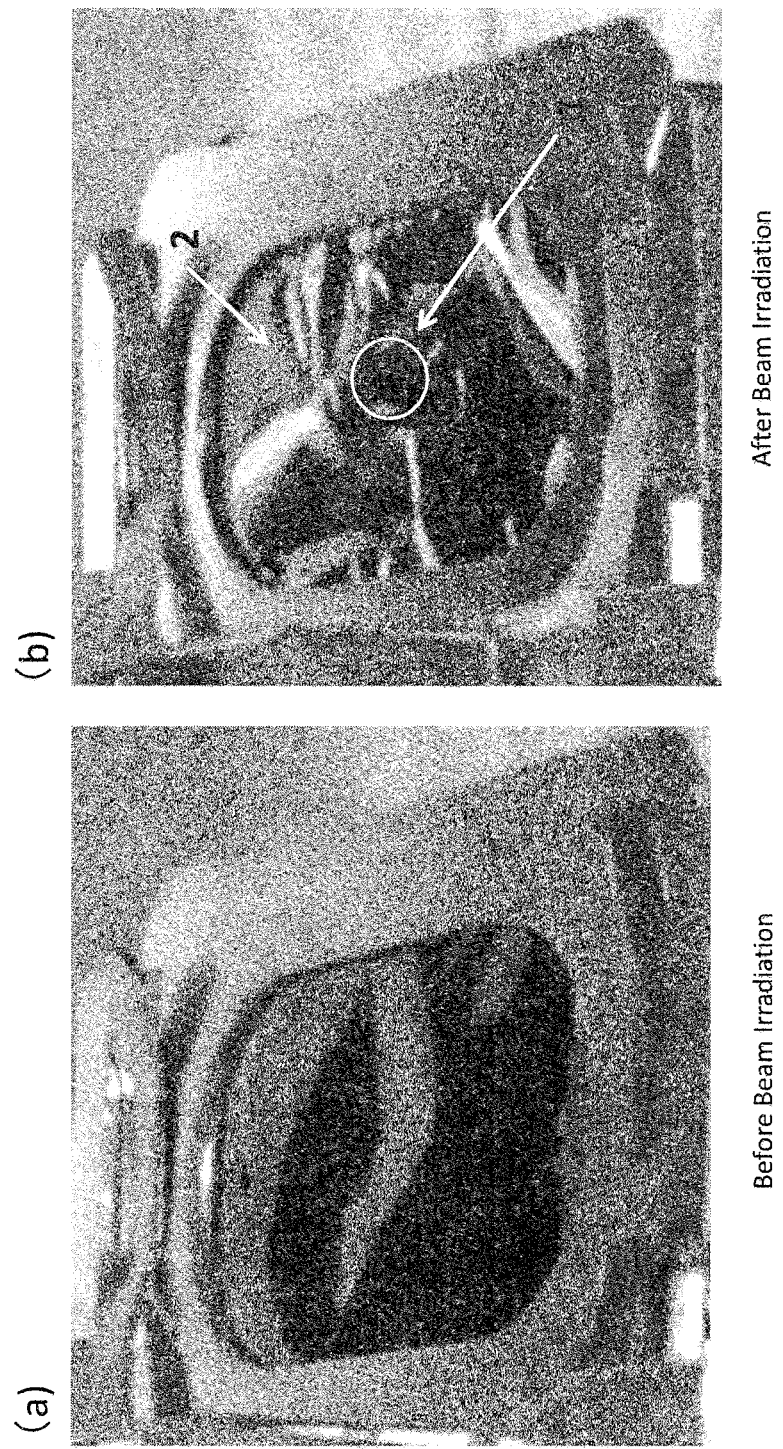
FIG. 7 is a photograph substitute for a drawing, showing an appearance shape of the charge stripping film of comparative example before and after irradiation with a calcium ion beam.

The thermal load on the charge stripping film at this current value was 1.953 W, and the total number of irradiation particles of calcium was 2.12×10$^{18}$. FIG. 7 shows photographs of the charge stripping film before and after irradiation. A big wrinkle was in the vicinity of a beam irradiation spot 1, the film was greatly distorted due to the wrinkle, and an irradiation spot 2 was broken during use.

From the comparison between Reference Example 1-1 and Comparative Example 1 described above, it can be seen that large deformation, cracks and the like were not observed in the same charge stripping film except that the thickness is different from that as in the present invention, despite the fact that the beam amount was about 2 times and the thermal load was 3 times or more as compared with the film produced by vapor deposition. The reason for this is presumed to be that the charge stripping film of the present invention has a very high heat resistance and a very high heat dissipation property. Also, since the charge stripping film of the present invention has high physical strength, it can be used at high rotation speed, and local heating of the film can be relaxed by rotation, so it is considered that breakage hardly occurs.

(1-3) Durability when Irradiated with Uranium Ion Beam

Reference Example 1-2, Example 1-2, and Example 1-3

Evaluation of the charge stripping rate was carried out by irradiating charge stripping films A (thickness 4 μm), B (thickness 10 μm), and E (thickness 2 μm) individually disposed at the position 10b shown in FIG. 1, with a $U^{64+}$ (uranium) DC beam having a beam current of about 1 to 10 eμA, a beam energy of 50 MeV/u, and a beam shape of 4 to 5 mm in diameter using an accelerator of Nishina Center for Accelerator-Based Science, RIKEN, Japan. The beam current and the beam energy each means the maximum value. The degree of vacuum during charge stripping was $1\times10^{-3}$ Pa or less, and the size of the charge stripping film was ϕ11 cm.

The charge stripping films A, B, and E (the material of the substrate 22 for supporting the charge stripping film is copper, and the outer diameter is ϕ65 mm to ϕ75 mm) rotated by using the holder shown in FIG. 2 were irradiated with a uranium ion beam ($U^{64+}$) of an irradiation energy of 50 MeV/u, and a beam current of about 1 to 10 eμA. Example 1-2 is an example in which the uranium ion beam was irradiated to the charge stripping film A rotated at 300 rpm for 2 hours and then the charge stripping film A was rotated at 1000 rpm to be further irradiated for 5 minutes. Reference Example 1-2 is an example in which a uranium ion beam was irradiated to the charge stripping film B rotated at 300 rpm for 5 minutes. Example 1-3 is an example in which a DC beam of $U^{64+}$ (uranium) was gradually irradiated to the charge stripping film E rotated at 1000 rpm while increasing the beam current and irradiated for about 3 minutes (maximum beam current: 1 eμA). The thermal load on the graphite film at this current value was 8.9 W in Reference Example 1-2, 21 W in Example 1-2, and 0.4 W in Example 1-3. Photographs of the film before and after irradiation are shown in FIGS. 8 and 9. FIGS. 8(a) and 8(b) are photographs of Example 1-2 (charge stripping film A), and FIGS. 8(c) and 8(d) are photographs of Reference Example 1-2 (charge stripping film B), and FIG. 9 is a photograph of Example 1-3. In any of the examples, the film after the beam irradiation was slightly deformed in the vicinity of the beam irradiation position, and there was no big difference from before use, and furthermore pinholes, chipping, and the like could not be confirmed. As can be seen from FIG. 9, in the observation after the beam irradiation, even the irradiation traces of the beam could not be confirmed, and the same state as before the beam irradiation was maintained. Further, despite the fact that the rotary charge stripping film of the present invention is a thin film having a thickness of less than 10 μm, the charge stripping film is excellent in physical strength. Further, the rotary charge stripping film with a thickness of 4 μm did not break in Example 1 even if the beam irradiation was continued while increasing the rotation gradually from 300 rpm and rotating at 1,000 rpm for 5 minutes. Increasing the rotation speed is extremely preferable in the point such that the deformation of the charge stripping film due to the heat cycle can be suppressed since the temperature difference in the superheating-cooling process by the irradiation of the high-intensity beam becomes small.

(2) Evaluation of Charge Stripping Rate of Ion Beam
(2-1) Evaluation of Charge Stripping Rate of Calcium Ion Beam Example 2-1 and Comparative Example 2-1

Evaluation of the charge stripping rate was carried out by irradiating the charge stripping film A disposed at the position 10b shown in FIG. 1, with a $Ca^{16+}$ (calcium) DC beam having a beam current of about 10 eμA, a beam energy of 45 MeV/u, and a beam shape of 4 to 5 mm in diameter using an accelerator of Nishina Center for Accelerator-Based Science, RIKEN, Japan (Example 2-1). The degree of vacuum during charge stripping was $1\times10^{-3}$ Pa or less, the size of the charge stripping film was a circular shape having ϕ11 cm, and the minimum rotation speed of the charge stripping film was 300 rpm. For the purpose of reference, the stationary vapor deposition film for comparison used in Comparative Example 1 was also subjected to charge stripping.

Stripping efficiency to $Ca^{20+}$ of Example 2-1 (charge stripping film A) was about 87%, whereas the stripping efficiency to $Ca^{20+}$ of the charge stripping film of Comparative Example 2-1 was about 84%. It is understood that the efficiency of the charge stripping film of the invention is about 3% better than the efficiency of the charge stripping film of Comparative Example 2-1. The reason for this is considered to be that the charge stripping film of the present invention has a higher carbon density. Further, although the charge stripping film of the present invention is a rotary type, it has been confirmed that the charge stripping distribution does not widen as compared with the charge stripping film of the stationary type in comparative example. This is thought to be due to the high thickness uniformity of the charge stripping film of the present invention.

(2-2) Evaluation of Charge Stripping Rate of Uranium Ion Beam

Examples 2-2, 2-3, Reference Examples 2-1, 2-2, and Comparative Examples 2-2, 2-3

Figure 10:
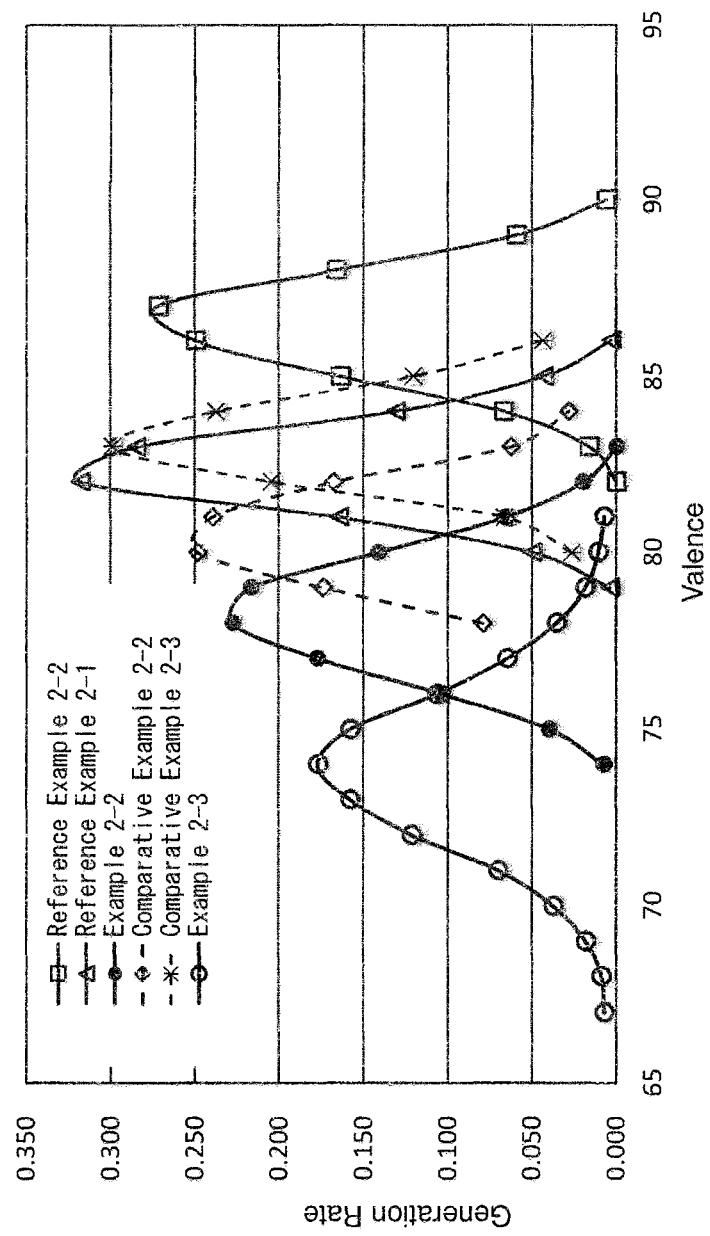
FIG. 10 is a graph showing a valence distribution of a uranium ion beam after passing through the charge stripping film.

Evaluation of the charge stripping rate was carried out by irradiating the charge stripping film A (4 μm, Example 2-2) and the charge stripping film E (2 μm, Example 2-3) disposed at the position 10b shown in FIG. 1, with a $U^{64+}$ (uranium) DC beam having a beam current (maximum value) of about 1 to 10 eμA, a beam energy of 50 MeV/u, and a beam shape of 4 to 5 mm in diameter using an accelerator of Nishina Center for Accelerator-Based Science, RIKEN, Japan. The degree of vacuum during charge stripping was $1\times10^{-3}$ Pa or less, the size of the charge stripping film was a circular shape having ϕ11 cm, and the minimum rotation speed of the charge stripping film was 300 rpm. For reference, a charge stripping film B (10 μm, Reference Example 2-1) and a film obtained by laminating two charge stripping films C to make it 70 μm (Reference Example 2-2) were also subjected to charge stripping in a rotary manner. For further comparison, an evaporated film (Arizona films 1 and 2 listed in Table 1) purchased from Arizona Carbon Foil Co. Inc., USA, was subjected to charge stripping in a stationary manner (Comparative Examples 2-2, 2-3). FIG. 10 shows the production ratios of uranium ion beams of respective valences obtained after the $U^{64+}$ beam passed through the charge stripping films.

The peak valence of the uranium beam, obtained by passing through the charge stripping film A of Example 2-2 and the charge stripping film E of Example 2-3, is 78+ and 74+, respectively. In both cases, the generated intensity is sufficiently high, and the width of valence distribution is sufficiently narrow. These effects are more conspicuous in the charge stripping film A as compared with the charge stripping film E. In addition, the peak valence of the charge stripping film B of Reference Example 2-1 was 82+, and the peak valence of an example in which the charge stripping film C of Reference Example 2-2 was laminated was 87+, and it is understood that the valence can be easily controlled by the film thickness. In addition, although the charge stripping film of the present invention is a rotary type, the charge stripping distribution does not spread wider than that of the stationary charge stripping film of comparative example. This is thought to be due to the high thickness uniformity of the charge stripping film of the present invention. In Reference Example 2-1, the generation rate of peak valence is slightly higher than in other examples. This is because uranium nuclei are likely to exist in 10 electrons (82+) due to the shell effect of the nucleus.

From the above, it is possible to easily change the valence by changing the film thickness of the charge stripping film even for uranium beam with a high intensity, and the charge stripping distribution of the obtained ion beam is also sharp. Thus, it can be seen that the charge stripping film is applicable also to various ion beams.

(3) Evaluation of Uranium Beam Convergence after Passing Through Charge Stripping Film (Second Charge Stripping Film)

Figure 11:
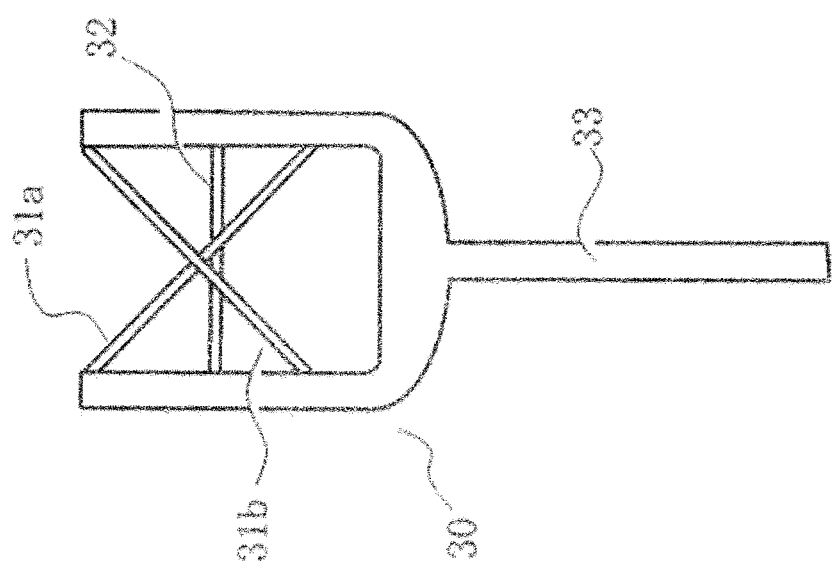
FIG. 11 is a schematic view showing a shape of a measurement tip portion of a profile monitor.

The convergence of the ion beam was evaluated by irradiating the charge stripping films A, B and C individually disposed at 10b shown in FIG. 1, with a $U^{64+}$ (uranium) DC beam having a beam current (maximum value) of about 10 eμA and a beam energy of 50 MeV/u, using an accelerator of Nishina Center for Accelerator-Based Science, RIKEN, Japan, and by using a profile monitor of the shape shown in FIG. 11 at positions 13a and 13b in FIG. 1. The degree of vacuum was $1 \times 10^{-3}$ Pa or less, the diameter of the charge stripping film was 11 cm, and the number of revolutions was 300 rpm. The holder shown in FIG. 2 was used. The profile monitor is a device in which a beam is cut in round slices with a wire and then scanned. The profile monitor 30 shown in FIG. 9 is a device for observing a shape of an ion beam, including two orthogonal wire sensors 31a and 31b, and a wire sensor 32 forming an angle of 45 degrees with these two wire sensors, these sensors being attached to a substantially Y-shaped jig 33. Convergence can be evaluated by drawing a graph by plotting the relationship between the position of the wire touched by the beam and the current value at that time and comparing the graph. The scanning with the wire sensor was performed in three different directions, including vertical, horizontal, and diagonal 45 degrees directions. The wire of the profile monitor is a ribbon wire of tungsten (manufactured by The Nilaco Corporation), and the wire sensors 31a and 31b in FIG. 9 were each 0.3 mm in thickness, 3 mm in width, and 92 mm in length, and the wire sensor 32 was 0.3 mm in thickness, 3 mm in width, and 65 mm in length.

When the film thickness distribution has large unevenness, the beam profile fluctuation in the lateral direction synchronized with the rotation (the profile fluctuates in the axial direction of at least one of longitudinal, lateral, and oblique axes in the beam profile) is observed. In addition, when there is small unevenness in the film thickness distribution, an asymmetric shape is drawn. Even if the charge stripping film A of the present invention is irradiated with a beam while rotating at 300 rpm, the beam profile measured at the positions 13a and 13b in FIG. 1 does not move laterally, and asymmetry of the beam profile synchronized with rotation was not observed (the same is true for the charge stripping films B and C). This means that the charge stripping film of the present invention has good uniformity of the film thickness distribution and has few large or small unevenness even if it has a large area. Even if the charge stripping film A of the present invention was irradiated with a beam for 2 hours, a large change in the beam profile shape could not be confirmed.

From the above results, it is understood that the uniformity of the film thickness distribution of the charge stripping film of the present invention is very high, and the charge stripping film of the present invention is a material very suitable as a charge stripping film which can withstand use even for a long time.

INDUSTRIAL APPLICABILITY

The charge stripping film of the present invention can be preferably used as a charge stripping film for use not only in a large-size accelerator, but also in a medical accelerator such as an accelerator for cancer therapy and in a relatively small-size accelerator for industrial use or the like.

DESCRIPTION OF REFERENCE SIGNS 10a, 10b: Charge stripping film
11a, 11b: Beam converging electromagnet
12: Bending magnet
13a, 13b: Beam profile detector
14: Incident ion beam
21: Substrate for fixing charge stripping film
22: Substrate for supporting charge stripping film
23: Rotary charge stripping film
24: Substrate for fixing charge stripping film
30: Profile monitor
31a, 31b, 32: Wire sensor

The invention claimed is:
1. A charge stripping method of an ion beam, comprising irradiating a charge stripping film, which is rotating, with an ion beam,
wherein:
the charge stripping film is a rotary charge stripping film comprising a carbon film having a thermal conductivity of 500 W/mK or more in a film surface direction at 25° C.,
a density of the carbon film is not less than 1.5 g/cm$^3$,
the carbon film has a circular shape,
the charge stripping film has a jig serving as the axis of rotation at the center thereof,
a film thickness of the carbon film is 0.2 μm or more and less than 10 μm, and
the ion beam is an ion beam of iron, argon, magnesium, or sodium.
2. The charge stripping method according to claim 1, wherein a rotation speed of the charge stripping film is not less than 1 rpm and not more than 3000 rpm.

3. The charge stripping method according to claim 1, wherein the charge stripping of the ion beam is performed in a vacuum environment of $1\times10^{-3}$ Pa or less.

* * * * *